United States Patent [19]

Kellerhof et al.

[11] Patent Number: 5,411,389

[45] Date of Patent: May 2, 1995

[54] APPARATUS FOR THE CONTINUOUS PRODUCTION OF FOAMED PLASTICS

[75] Inventors: Ingo Kellerhof, Seelscheid; Hans-Dieter Pfeil, Wuppertal; Kurt Krippl, Monheim, all of Germany

[73] Assignee: Bayer Aktiengesellschaft, Leverkusen, Germany

[21] Appl. No.: 165,122

[22] Filed: Dec. 10, 1993

[30] Foreign Application Priority Data

Dec. 21, 1992 [DE] Germany ............... 42 43 277.4

[51] Int. Cl.[6] .................. B29C 44/20; B29C 44/50
[52] U.S. Cl. .................... 425/4 C; 264/15.9; 425/188; 425/190; 425/817 C
[58] Field of Search ............ 425/4 C, 817 C, 182, 425/183, 185, 188, 190; 264/45.8, 45.9

[56] References Cited

U.S. PATENT DOCUMENTS

| | | | |
|---|---|---|---|
| 3,776,990 | 12/1973 | Watkins, Jr. et al. | 264/54 |
| 3,777,347 | 12/1973 | McCorvey | 29/200 A |
| 3,872,199 | 3/1975 | Ottinger | 264/46.4 |
| 3,895,087 | 7/1975 | Ottinger et al. | 264/46.2 |
| 4,469,251 | 9/1984 | Sperry et al. | 222/135 |
| 4,568,003 | 2/1986 | Sperry et al. | 222/145 |
| 4,652,225 | 3/1987 | Dehennau et al. | 425/188 |
| 4,653,994 | 5/1987 | Capelle | 425/188 |
| 4,698,006 | 10/1987 | Ralphs | 425/185 |
| 4,725,215 | 2/1988 | Kreyenborg et al. | 425/185 |
| 4,850,840 | 7/1989 | Gneuss | 425/185 |
| 5,090,887 | 2/1992 | Gneuss | 425/185 |
| 5,208,049 | 5/1993 | Hatfield et al. | 425/185 |

FOREIGN PATENT DOCUMENTS

| | | | |
|---|---|---|---|
| 165896 | 12/1985 | European Pat. Off. | |
| 173772 | 3/1986 | European Pat. Off. | |
| 553695 | 8/1993 | European Pat. Off. | |
| 47569 | 9/1966 | France | 425/817 C |
| 2038253 | 2/1972 | Germany | |
| 3243184 | 5/1984 | Germany | 425/183 |
| 4217364 | 12/1993 | Germany | |
| 1117655 | 6/1968 | United Kingdom | |

*Primary Examiner*—Jay H. Woo
*Assistant Examiner*—Duane S. Smith
*Attorney, Agent, or Firm*—Joseph C. Gil; N. Denise Brown

[57] ABSTRACT

An apparatus for the continuous production of foamed plastics is described. The apparatus includes i) a continuous conveyor belt, and ii) a transversely reciprocating applicator device located over the belt for applying a foam-forming reaction mixture. The applicator device includes a mix head and a detachably mounted magazine plate having several openings thereon. Each opening has a casting tube connected thereto. Each casting tube has discharge holes on its underside. The plate is adjustable in such a way that the casting tubes can be connected successively to the outlet of the mixhead.

6 Claims, 3 Drawing Sheets

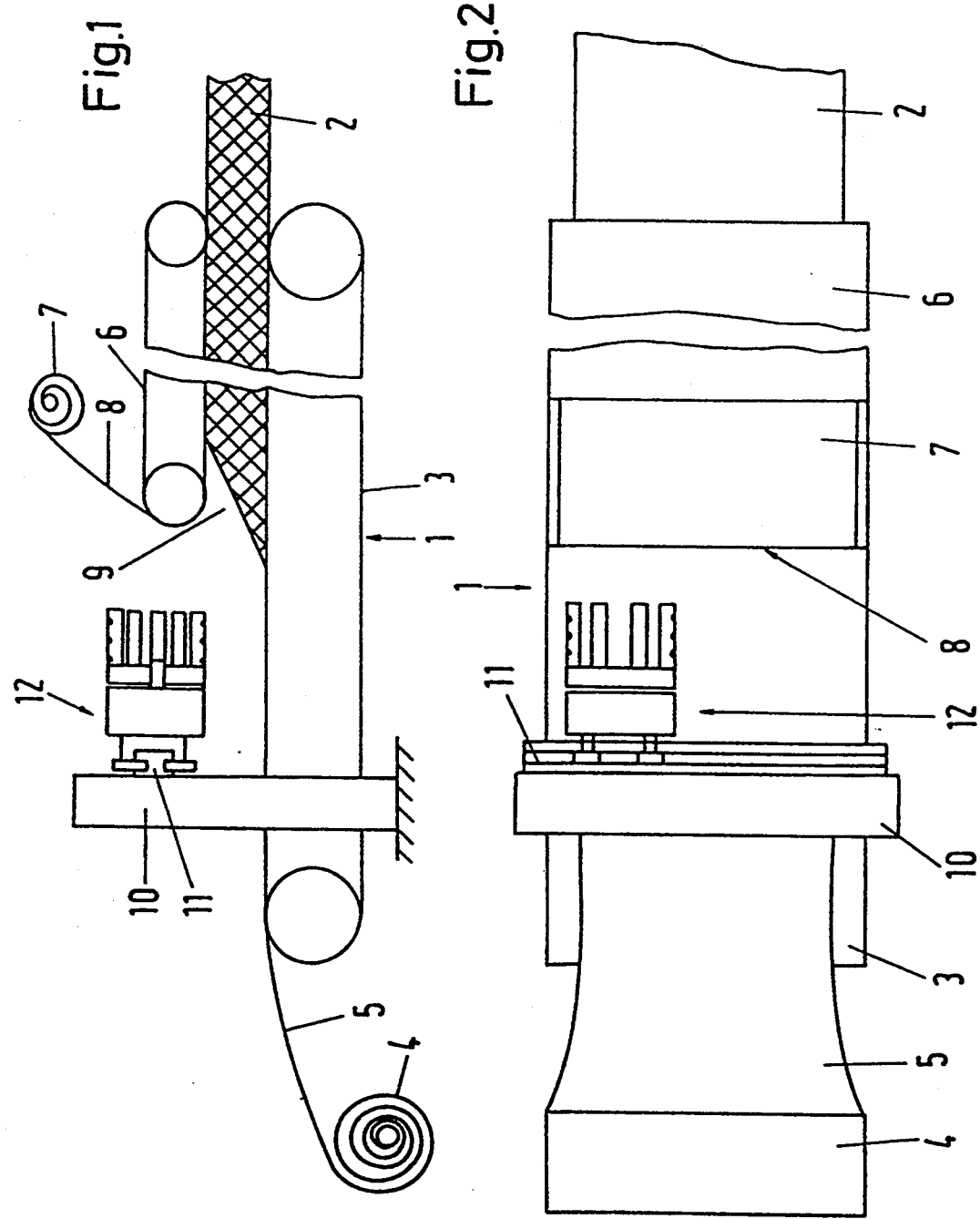

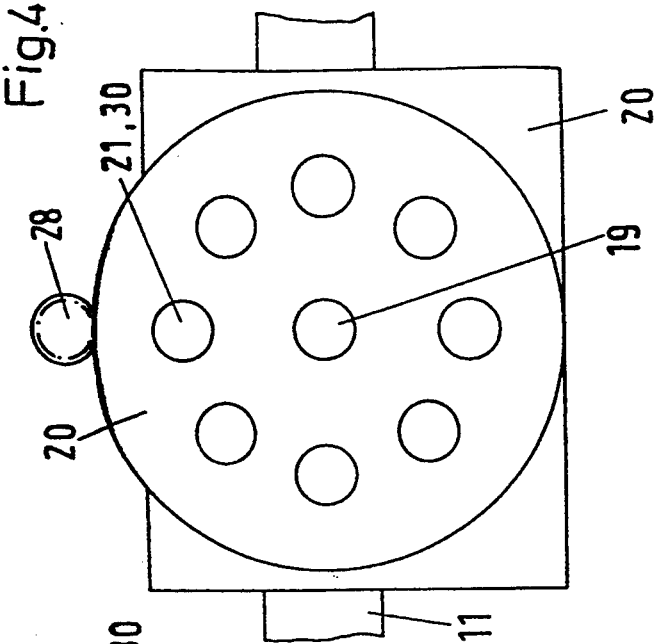
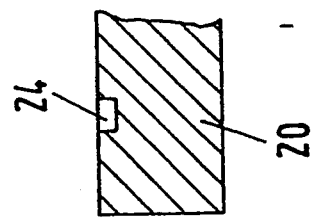
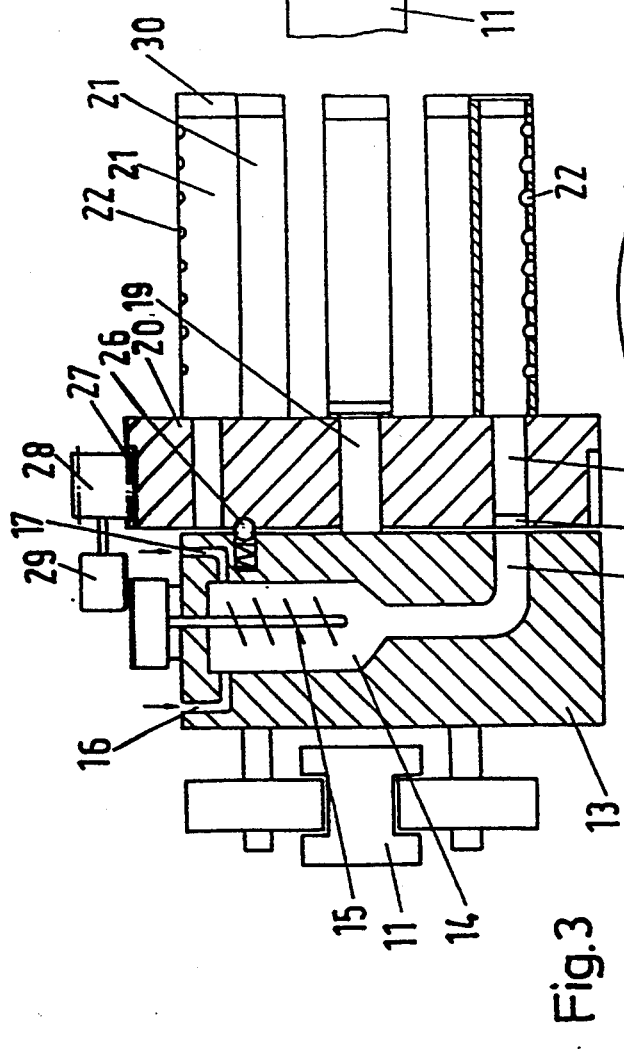
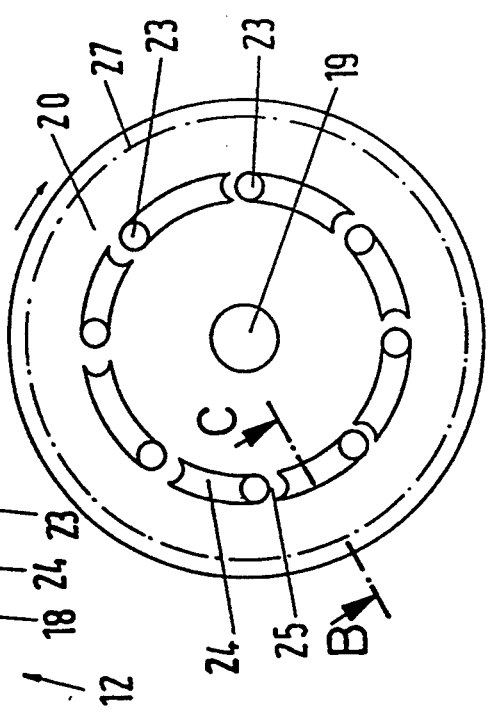

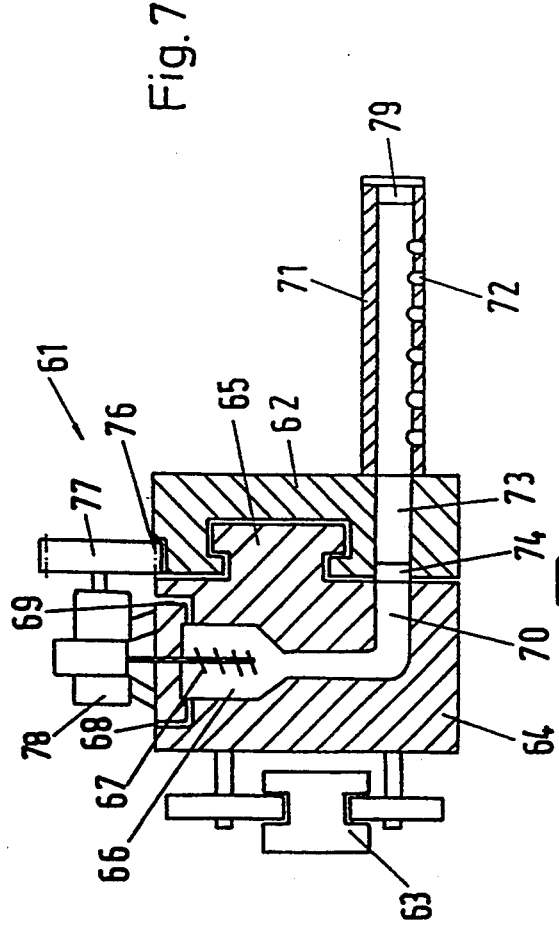
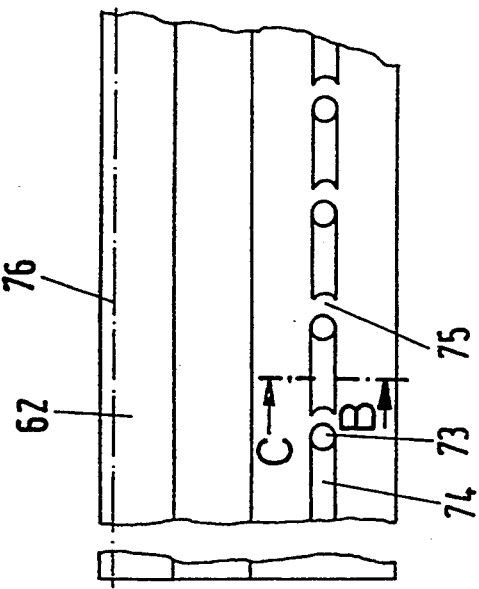
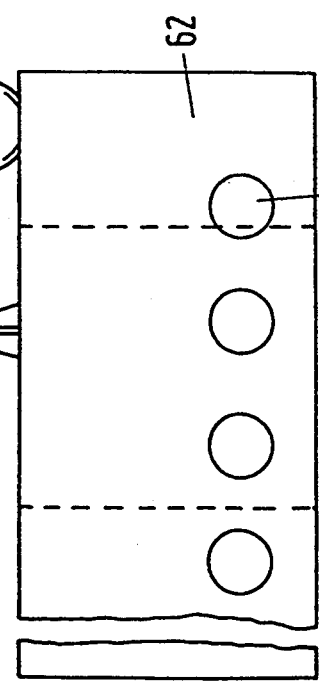

APPARATUS FOR THE CONTINUOUS PRODUCTION OF FOAMED PLASTICS

BACKGROUND OF THE INVENTION

The present invention relates to an apparatus for the continuous production of foamed plastics, and in particular of rigid foam panels. The apparatus broadly consists of a continuous conveyor belt and a portal arranged over it on the entrance side with a transversely reciprocating applicator device for a foam-forming reaction mixture. The applicator device consists of a mix head and a casting tube connected to its outlet channel, pointing in the conveying direction of the conveyor belt and provided on its underside with discharge holes.

Casting tubes are generally used for the application of reaction mixtures in so-called continuous laminator plants, and also can be used in slabstock plants. These casting tubes, called "casting rakes", repeatedly clog up during operation, whether by slow build-up during production or by curing of reaction mixture during breaks in production. The cleaning during interruptions of production by compressed air or solvent can raise environmental concerns. In addition, the production delays caused thereby raise the manufacturing costs.

SUMMARY OF THE INVENTION

The object of the present invention was to create an apparatus of the type mentioned, in which interruptions to production as a result of fouled or clogged-up casting tubes are avoided.

BRIEF DESCRIPTION OF THE DRAWINGS

FIG. 1 shows the apparatus of the invention in side view.

FIG. 2 shows the apparatus in plan view.

FIG. 3 shows the applicator device (12) of FIGS. 1 and 2 on an enlarged scale in section.

FIG. 4 shows a front view of the applicator device.

FIG. 5 shows a rear view of the magazine plate (20) of FIGS. 3 and 4.

FIG. 6 shows a sectional view along line B-C of FIG. 5.

FIG. 7 shows a second embodiment of an applicator device.

FIG. 8 shows a front view of the applicator device of FIG. 7.

FIG. 9 shows a rear view of the magazine plate of FIGS. 7 and 8.

DESCRIPTION OF THE INVENTION

The above object has been solved by providing several casting tubes on a magazine plate detachably mounted on the applicator device. The outlet channel of the applicator device points towards the magazine plate. The magazine plate is provided with an opening for each casting tube and is adjustable in such a way that the casting tubes can be connected successively via the openings assigned to them with the outlet channel of the applicator device. Thus, as soon as the operating personnel notice a fouling of the casting tube, they can immediately insert the next casting tube by adjusting the magazine plate. Preferably as many casting tubes are arranged on the magazine plate as are probably required for several hours' production. In a fairly long break in production, the whole magazine plate can be replaced by another, and the casting tubes of the used magazine plate can be cleaned for their next use.

According to one particular embodiment, pressure-relief channels are assigned to the openings, which are separated from neighboring openings or from the associated pressure-relief channel only by a narrow sealing land. In this way, upon switching to the next casting tube, the flow of mixture is scarcely interrupted and no pressure build-up striking back into the mixing chamber occurs.

The magazine plate can be designed as a rotatable disc on which the casting tubes are arranged in the form of a ring. Alternatively, the magazine plate can be designed as a fiat slide on which the casting tubes are arranged side by side.

Clearly, the spacings should be uniform. Preferably a detent is associated with each opening so that when each casting tube is used it can be brought into exact registration with the outlet channel of the mixing chamber.

The front ends of the casting tubes are preferably provided with a removable cap. This cap should be easily removable, and sit so firmly that it does not come off spontaneously during operation. If it has an extension piece reaching into the casting tube, this is advantageous because, after the removal of the cap, a suitable bolt can be introduced for cleaning into the space in the casting tube kept free of material by the extension piece and the cured material knocked out.

The magazine plate is preferably provided with an actuator. This has the advantage that the change-over to the next casting tube can occur without interruption of production if this actuator can be operated from a fixed part of the plant, for example, from a control console.

The new apparatus in two embodiments is represented schematically in the drawing and will be explained in more detail hereinafter.

in FIGS. 1 and 2, the apparatus consists of a continuous laminator (1) for the production of rigid foam panels (2) laminated with facing materials. The laminator consists of a lower belt (3), on which a paper web (5) drawn off from a roll (4) is transported, and an upper belt (6), beneath which likewise a paper web (8) drawn off from a roll (7) runs into a foam space (9) formed between lower belt (3) and upper belt (6). On the entry side, arranged above the lower belt (3), there is a portal (10), with a transverse track (11), on which an applicator device (12) reciprocates above the particular foam width chosen. For the sake of greater clarity, the drive of the applicator device (12)is not shown.

The applicator device (12) (represented in detail in FIGS. 3 to 6) consists of a carriage (13) running on the transverse track (11). A mixing chamber (14) with stirring unit (15) is arranged therein. Inlet feed pipes (16) and (17) for the reaction components are indicated. An outlet channel (18)leads away from the mixing chamber (14) and discharges against a magazine plate (20), which can be rotated about an axle (19) fixed to the carriage (13). The magazine plate is exchangeable and is designed as a disc. This plate equipped with eight welded-on casting tubes (21), arranged in a ring. Each casting tube has discharge holes (22) directed radially outward relative to the magazine plate (20). In the magazine plate (20) an opening (23) is provided for each casting tube (21). The back the magazine plate (20) has milled pressure-relief channels (24) which point to the next opening (23) and are separated from the next opening only by a narrow sealing land (25). A spring-loaded ball serves as a detent (26) and ensures that each opening (23) can be brought exactly into registration with the outlet channel (18). The face of the magazine plate (20) has a toothed ring (27), in which a pinion (28) with which drive (29) engages. The front ends of the casting tubes (21) are closed with a removable cap (30).

The embodiment illustrated in FIGS. 7 to 9 differs from that shown in FIGS. 1 to 6 only in that the applicator device (61) has instead of a magazine plate designed as a disc a magazine plate (62) designed as a fiat slide. The applicator device (61) consists of a carriage (64) running on a transverse track (63) of the portal. The magazine plate (62) can be slid in a guide track (65) on the carriage (64). In the carriage (64) there is arranged a mixing chamber (66) with stirrer unit (67). Feed pipes (68) and (69) for the reaction components are indicated. An outlet channel (70) leads away from the mixing chamber (66) and discharges against the magazine plate (62) which runs without leaks on the guide track (65). The magazine plate (62) is equipped with several casting tubes (71) arranged equidistantly in line and provided with downwardly pointing discharge holes (72). In the magazine plate (62) an opening (73) is assigned to each casting tube (71). On the back of this magazine plate (62), a milled pressure-relief channel (74) is assigned to each opening (73), which is separated from the adjacent opening (73) or, to be more exact, from its pressure-relief channel (74) only by a narrow sealing land (75). A detent, which is not shown, ensures that the individual openings (73) can in each case be brought exactly into registration with the outlet channel (70). On the upper edge, the magazine plate (62) has a toothed rail (76), in which a pinion (77) of the drive (78) engages. The front ends of the casting tubes (71) are closed with a removable cap (79).

Production on the apparatus mentioned is started with a magazine plate whose casting tubes are all cleaned. If during production the operating staff notices that the flow of reaction mixture ceases, this is a sign that the outlet hole concerned is clogged up. The staff switches over to the next casting tube by operating the drive of the magazine plate so that production is not interrupted. Even during short interruptions of production, for example during rests, during which the reaction mixture cures in the casting tube, the operating staff switches over to the next casting tube and so on. In a long break in production, the magazine plate is replaced, the caps of the used casting tubes are removed, a suitable bolt is stuck into each casting tube, and the cured material in the casting tube and pressure-relief channel is knocked out with blows from a hammer, during which the residues remaining in the discharge holes crack off. These discharge holes are cleaned similarly with a bolt of smaller diameter. It is often sufficient also to put the magazine plate, for some time, in a solvent bath in order to clean it.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the continuous production of foamed plastics comprising
    i) a continuous conveyor belt,
    ii) a transversely reciprocating applicator device located over said belt for applying a foam-forming reaction mixture, said applicator device comprising:
        a) a mix head where the components of said mixture are mixed, said mix head having an outlet channel, said outlet channel pointing towards
        b) a detachably mounted magazine plate has several openings thereon, each of said openings having a casting tube connected thereto, wherein each of said casting tubes points in the conveying direction of the conveyor belt and has discharge holes on the underside, and wherein said plate is adjustable in such a way that said casting tubes can be connected successively via the corresponding openings with said outlet channel.

2. The apparatus of claim 1, wherein a pressure-relief channel is pointed next to each opening of said magazine plate, each of said pressure-relief channels being separated from a neighboring opening by a narrow sealing land.

3. The apparatus of claim 1, wherein said magazine plate is as a rotatable disc, on which said casting tubes are arranged in the form of a ring.

4. The apparatus of claim 1, wherein said magazine plate is a fiat slide on which said casting tubes are arranged side by side.

5. The apparatus of claim 1, wherein each front end of each of said casting tubes is provided with a removable cap.

6. The apparatus of claim 1, wherein said plate is provided with a driving means therefor.

* * * * *